US008065909B2

(12) United States Patent
Rabhi

(10) Patent No.: US 8,065,909 B2
(45) Date of Patent: Nov. 29, 2011

(54) DEVICE FOR DIRECTLY MEASURING ON A PISTON THE EFFECTIVE VOLUMETRIC RATIO OF A VARIABLE COMPRESSION RATIO ENGINE

(76) Inventor: Vianney Rabhi, Lyons (FR)

( * ) Notice: Subject to any disclaimer, the term of this patent is extended or adjusted under 35 U.S.C. 154(b) by 138 days.

(21) Appl. No.: 12/596,391

(22) PCT Filed: Apr. 16, 2008

(86) PCT No.: PCT/FR2008/000530

§ 371 (c)(1),
(2), (4) Date: Oct. 16, 2009

(87) PCT Pub. No.: WO2008/145837

PCT Pub. Date: Dec. 4, 2008

(65) Prior Publication Data

US 2010/0107746 A1 May 6, 2010

Related U.S. Application Data

(60) Provisional application No. 60/907,784, filed on Apr. 17, 2007.

(30) Foreign Application Priority Data

Apr. 16, 2007 (FR) ..................................... 07 02731

(51) Int. Cl.
*G01M 15/08* (2006.01)

(52) U.S. Cl. .................................................... 73/114.16

(58) Field of Classification Search ............... 73/114.16, 73/114.22
See application file for complete search history.

(56) References Cited

U.S. PATENT DOCUMENTS

| | | | | |
|---|---|---|---|---|
| 4,834,031 | A | 5/1989 | Katoh et al. | |
| 5,406,911 | A | 4/1995 | Hefley | |
| 6,857,401 | B1 | 2/2005 | Styron | |
| 6,932,054 | B2 * | 8/2005 | Kikori | 123/347 |
| 7,028,647 | B2 * | 4/2006 | Styron | 123/48 B |
| 7,159,543 | B2 * | 1/2007 | Hotta et al. | 123/48 R |
| 7,213,543 | B2 * | 5/2007 | Miyashita | 123/48 C |
| 7,278,383 | B2 * | 10/2007 | Kamiyama et al. | 123/48 C |
| 7,360,513 | B2 * | 4/2008 | Takemura et al. | 123/48 B |
| 7,422,004 | B2 * | 9/2008 | Akihisa et al. | 123/478 |
| 7,562,642 | B2 * | 7/2009 | Rabhi | 123/48 B |

(Continued)

FOREIGN PATENT DOCUMENTS

DE 3825369 5/1989

(Continued)

OTHER PUBLICATIONS

International Search Report dated Oct. 17, 2008 in PCT application.

*Primary Examiner* — Freddie Kirkland, III
(74) *Attorney, Agent, or Firm* — Young & Thompson

(57) ABSTRACT

A device for measuring the effective volumetric ratio of at least one cylinder in a variable compression-ratio engine, includes at least one target passage sensor (91) attached on the cylinder casing (100) and detecting the passage of at least one target (92) connected to the piston (2) of the engine, the target passage sensor interacting with at least one angular position sensor of the crankshaft (93) of the engine, and one calculator (94).

4 Claims, 1 Drawing Sheet

U.S. PATENT DOCUMENTS

Figure 1:
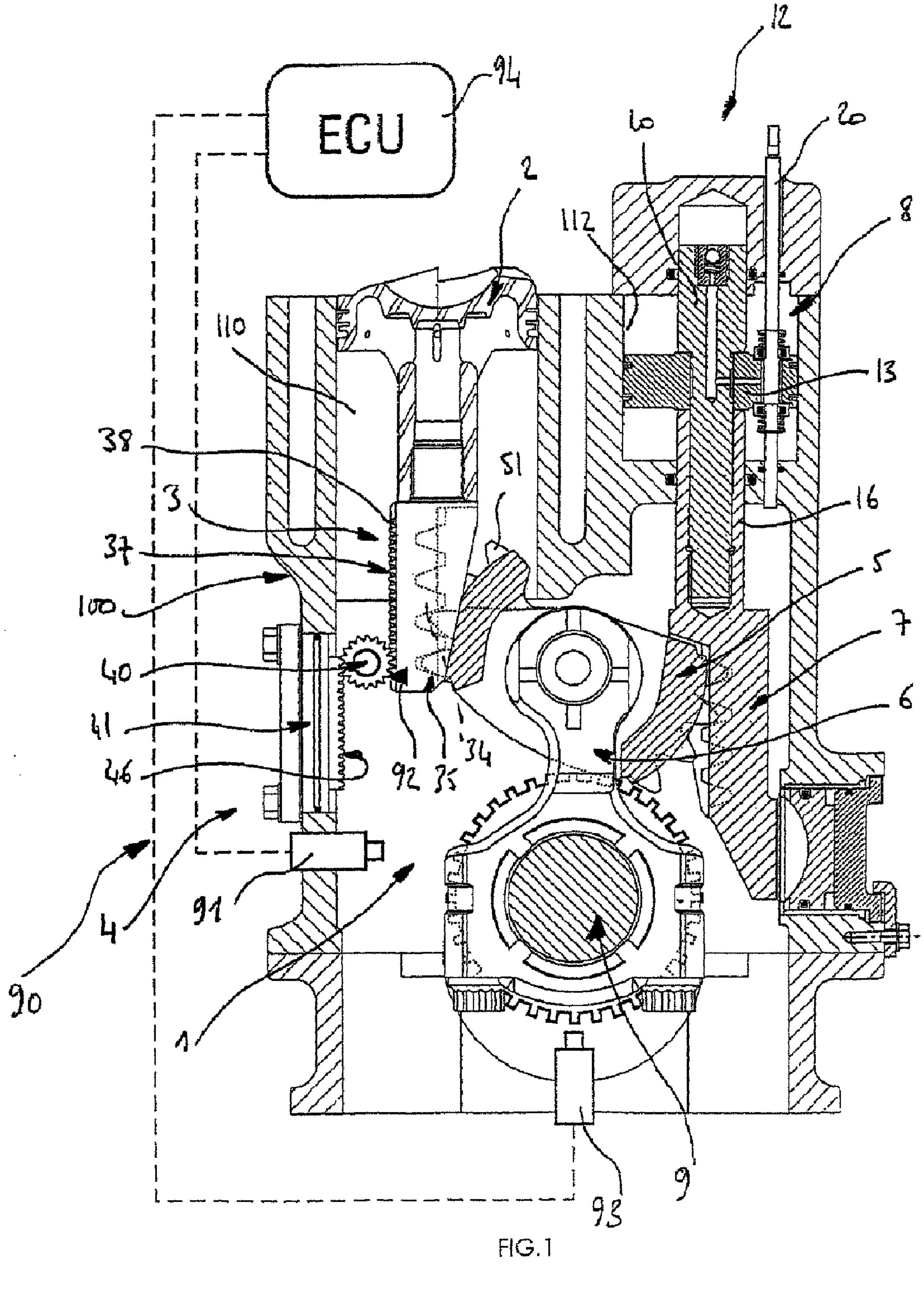

| | | | | |
|---|---|---|---|---|
| 7,802,544 | B2 * | 9/2010 | Kamada | 123/78 F |
| 7,840,335 | B2 * | 11/2010 | Akihisa et al. | 701/104 |
| 7,882,821 | B2 * | 2/2011 | Akihisa et al. | 123/347 |
| 2004/0194737 | A1 * | 10/2004 | Miyashita | 123/48 C |
| 2005/0087155 | A1 * | 4/2005 | Kikori | 123/78 C |
| 2006/0070605 | A1 * | 4/2006 | Akihisa et al. | 123/478 |
| 2006/0180118 | A1 * | 8/2006 | Takemura et al. | 123/197.4 |
| 2007/0095313 | A1 * | 5/2007 | Kamiyama et al. | 123/90.16 |
| 2008/0017023 | A1 * | 1/2008 | Rabhi | 92/13.7 |

FOREIGN PATENT DOCUMENTS

| | | |
|---|---|---|
| DE | 4028594 | 3/1992 |
| EP | 1464814 | 10/2004 |
| JP | 63105244 | 5/1988 |
| WO | 9851911 | 11/1998 |
| WO | 0031377 | 6/2000 |
| WO | 03008783 | 1/2003 |
| WO | 2005098219 | 10/2005 |
| WO | 2007085739 | 8/2007 |

* cited by examiner

DEVICE FOR DIRECTLY MEASURING ON A PISTON THE EFFECTIVE VOLUMETRIC RATIO OF A VARIABLE COMPRESSION RATIO ENGINE

The subject of the present invention is a device making it possible to directly measure on the piston the effective volumetric ratio of at least one cylinder of a variable compression ratio engine which comprises at least one sensor attached to the cylinder block of said engine which detects the travel of at least one target secured to the piston of said engine, said sensor interacting with at least one angular position sensor of the crankshaft of said engine, and a computer.

According to international patents WO98/51911, WO00/31377 and WO03/008783 belonging to the applicant, various mechanical devices for a variable displacement engine are known.

It is noted that international patent WO98/51911 in the name of the applicant describes a device used to enhance the overall efficiency of internal combustion engines with pistons used at variable load and speed by in-operation adaptation of their effective displacement and/or of their volumetric ratio. Since this type of engine is known to those skilled in the art by the name “variable compression ratio engine”, this name will be adopted in the following text.

It is noted that, according to international patent WO00/31377 in the name of the applicant, the mechanical transmission device for a variable compression ratio engine comprises a piston that is secured in its bottom portion to a transmission member interacting on the one hand with a rolling guidance device and, on the other hand, with a gearwheel secured to a connecting rod making it possible to transmit the movement between said piston and said connecting rod.

It is noted that, according to international patent WO03/008783 in the name of the applicant, the mechanical transmission device for a variable compression ratio engine comprises at least one cylinder in which a piston moves which is secured, in its bottom portion, to a transmission member interacting on the one hand via a small-dimension rack with a rolling guidance device and, on the other hand, by means of another large-dimension rack, with a gearwheel secured to a connecting rod.

Said mechanical transmission device for a variable compression ratio engine also comprises at least one control rack interacting with the gearwheel, means for attaching the piston to the transmission member which offer a clamping prestress, connection means which make it possible to stiffen the teeth of the racks, and means for reinforcing and lightening the structure of the gearwheel.

It is observed that according to international patents WO98/51911 and PCT/FR2007/000149, the compression ratio of the variable compression ratio engine is regulated by means of a control hydraulic jack the movement of which is provided by the forces resulting from the inertia of the moving parts and from the pressure of the engine gases which are applied to the control rack to which said jack is secured.

It is noted that, according to patents WO98/51911, WO2005/098219 and FR No06/00708, a sensor may be provided to measure the position of the control rack of the variable compression ratio engine in order to notify the management computer of said engine of the position of said control rack.

It is noted, in all the aforementioned patent applications and patents in the name of the applicant, that the power transmission system of the variable compression ratio engine comprises more moving parts than that of a conventional fixed compression ratio engine. This particular feature lengthens the chain of dimensions on which the position of the piston relative to the cylinder head depends.

It is noted however that French patent application No06/00708 in the name of the applicant describes a device for the initial regulation of the compression ratio cylinder by cylinder, that can be applied to the variable compression ratio engine particularly during its assembly, and which makes it possible to minimize the dispersions of compression ratios between the cylinders of one and the same engine.

Taking account of the large number of moving parts in the variable compression ratio engine, of the total functional clearances between said parts, of the differential expansions between said parts that are subjected to variable operating temperatures, of the wear and tarnishing actions to which the contact surfaces of said parts are possibly subjected during the life of said engine, it is not possible to guarantee that the value of the volumetric ratio of said engine reported by a sensor which measures the position of the control rack of said engine correctly corresponds to the effective volumetric ratio of said engine.

It is to solve this problem that the device according to the invention makes it possible to measure the effective volumetric ratio of at least one cylinder of the variable compression ratio engine directly on the piston while the latter makes a reciprocating translation movement in said cylinder.

Accordingly, the device according to the invention makes it possible, based on the capture of two signals and a computation made by a computer, to notify the management system of the variable compression ratio engine of the effective height of the piston at Top Dead Center (TDC) relative to the cylinder head of said engine.

Therefore, the device according to the invention makes it possible to considerably improve the reliability of the measurement of the effective volumetric ratio of said engine in that:

- The direct measurement, on the piston of the variable compression ratio engine, of the height of said piston during the operation of said engine makes it possible to reduce the errors induced by the lack of uniformity in the expansion of the various components of said engine, said lack of uniformity of expansion leading to a difference between the position of the piston at Top Dead Center (TDC) of said engine computed on the basis of the position of the control rack measured by means of a sensor installed directly on said rack, and the effective position of the piston at Top Dead Center (TDC) of said engine on which the effective volumetric ratio of said engine depends.
- The direct measurement, on the piston of the variable compression ratio engine, of the height of said piston during the operation of said engine makes it possible to reduce the errors induced by the variations in operating clearance between the various components of said engine, said variations in clearance leading to a difference between the position of the piston at Top Dead Center (TDC) of said engine computed on the basis of the position of the control rack measured by means of a sensor installed directly on said rack, and the effective position of the piston at Top Dead Center (TDC) of said engine on which the effective volumetric ratio of said engine depends.
- The direct measurement, on the piston of the variable compression ratio engine, of the height of said piston during the operation of said engine makes it possible to reduce the errors induced by the wear, the tarnishing action or the deformation of the various components of said engine, said wear, said tarnishing action or said deformation being able to lead to a difference between the position of the piston at Top Dead Center (TDC) of said engine computed on the basis of the position of the control rack measured by means of a sensor installed directly on said rack, and the effective position of the piston at Top Dead Center (TDC) of said engine on which the effective volumetric ratio of said engine depends.

It is therefore to increase the reliability and precision of the measurement of the volumetric ratio of the variable compression ratio engine that the device according to the invention proposes to measure the effective volumetric ratio of said engine in operation directly on the piston of said engine, which makes it possible:

to significantly reduce the uncertainties associated with the measurement of the effective volumetric ratio of the variable compression ratio engine, whether said uncertainties are associated with lack of uniformity in expansions or with a modification of the functional clearances and of the dimensions of the moving parts of said engine;

to reduce the risks of pinking characteristic of an abnormal combustion, said pinking being able to occur if too high a volumetric ratio has been applied to the variable compression ratio engine because of a measurement of the volumetric ratio of said engine not being representative of the effective volumetric ratio of said engine, said pinking being able to damage said engine;

to optimize the efficiency of the variable compression ratio engine thanks to a measurement of the effective volumetric ratio that is more reliable and that makes it possible to come closer to the pinking limit but without reaching it.

The device making it possible to measure the effective volumetric ratio of at least one cylinder of a variable compression ratio engine according to the present invention comprises at least one target travel sensor attached to the cylinder block and situated beneath the rolling surface of the synchronized roller of a rolling guidance device which detects the travel of at least one target situated on a transmission member secured to the piston of said engine, said target travel sensor interacting with at least one angular position sensor of a crankshaft of said engine, and a computer.

The device making it possible to measure the effective volumetric ratio of at least one cylinder of a variable compression ratio engine according to the present invention comprises a target that is placed on the face of the transmission member which comprises a small-dimension rack.

The device making it possible to measure the effective volumetric ratio of at least one cylinder of a variable compression ratio engine according to the present invention comprises a target that consists of a hole or similar element arranged in the transmission member.

The device making it possible to measure the effective volumetric ratio of at least one cylinder of a variable compression ratio engine according to the present invention comprises a target that consists of a pin or similar element secured to the transmission member.

The following description with respect to the appended drawing, given as a nonlimiting example, will make it possible to better understand the invention, the features that it proposes and the advantages that it is likely to provide.

FIG. 1 is a schematic view in section illustrating the main components of the device making it possible to measure the effective volumetric ratio of at least one cylinder of a variable compression ratio engine according to one variant of the invention, and their positioning in the variable compression ratio engine.

DESCRIPTION OF THE INVENTION

FIG. 1 shows a device 90 making it possible to directly measure on the piston 2 the effective volumetric ratio of at least one cylinder 110 of a variable compression ratio engine.

According to the patent applications and the patent belonging to the applicant, the variable compression ratio engine comprises a mechanical transmission device 1 comprising, in the bottom portion of the piston 2, a transmission member 3 secured to said piston and interacting, on the one hand, with a rolling guidance device 4, and, on the other hand, with a gearwheel 5.

The gearwheel 5 interacts with a connecting rod 6 connected to a crankshaft 9 in order to transmit the movement between the piston 2 and said crankshaft 9.

The gearwheel 5 interacts opposite to the transmission member 3 with a control rack 7 the vertical position of which relative to the cylinder block 100 is controlled by a control device 12 comprising a control jack 8, the jack piston 13 of which is guided in a jack cylinder 112 arranged in the cylinder block 100. The control jack 8 consists of a top jack rod 10, a bottom jack rod 16, a jack piston 13 and a control rod 20.

The transmission member 3 secured to the piston 2 is provided on one of its faces with a first large-dimension rack 35 the teeth 34 of which interact with those 51 of the gearwheel 5.

The transmission member 3 comprises, opposite to the first rack 35, a second rack 37 the small-dimension teeth 38 of which interact with those of a roller 40 of the rolling guidance device 4.

The cylinder block 100 is secured to a support 41 comprising racks 46 synchronizing the movement of the roller 40 of the rolling guidance device 4 with that of the piston 2.

The device 90 making it possible to measure the effective volumetric ratio of at least one cylinder 110 of a variable compression ratio engine according to the present invention comprises at least one target travel sensor 91 attached to the cylinder block 100.

The device 90 making it possible to measure the effective volumetric ratio of at least one cylinder 110 of a variable compression ratio engine comprises at least one target 92 secured to the piston 2. The target travel sensor 91 is designed to detect the travel of the target 92 secured to the piston 2.

The device 90 making it possible to measure the effective volumetric ratio of at least one cylinder 110 of a variable compression ratio engine comprises at least one angular position sensor of the crankshaft 93, and at least one computer 94.

The target travel sensor 91 is designed to interact with the angular position sensor of the crankshaft 93 and the computer 94.

The target travel sensor 91 is situated beneath the rolling surface of the synchronized roller 40 of the rolling guidance device 4 of the variable compression ratio engine.

The target 92, secured to the piston 2, is situated on the transmission member 3 of the mechanical transmission device 1 of the variable compression ratio engine.

The target 92 is placed on the face of the transmission member 3 which comprises the small-dimension rack 37 and opposite to the teeth 34 of the first large-dimension rack 35.

The target 92 may consist of a hole or similar element arranged in the transmission member 3.

Also, the target 92 may consist of a pin or similar element secured to the transmission member 3.

The target travel sensor 91 attached to the cylinder block 100 is based on the "Hall" effect principle.

As a variant, the target travel sensor 91 may consist of a coil cyclically traversed by an electric current making it possible to detect the travel of the target 92, said current traversing said coil when the target passes in front of said coil, said target 92 consisting of a material that creates a magnetic field.

According to another embodiment, the target travel sensor 91 may consist of two superposed coils defining a miniature electric current transformer, the transformation ratio of the current making it possible to detect the travel of the target 92, said target consisting of a magnetic material.

According to another embodiment, the target travel sensor 91 may be an optical detection sensor, of the capacitive type, or of any other type known to those skilled in the art.

Operation:

The operation of the device 90 making it possible to directly measure on the piston 2 the effective volumetric ratio of at least one cylinder 110 of the variable compression ratio engine is as follows:

When the variable compression ratio engine is running, the piston 2 makes back-and-forth movements between its Top Dead Center (TDC) and its Bottom Dead Center (BDC).

Accordingly, the target 92 secured to the piston 2 passes in front of the target travel sensor 91 on each upstroke and on each downstroke of said piston 2 in its cylinder 110.

When said target 92 passes in front of said target travel sensor 91, the corresponding signal is received by the computer 94 which registers—via a signal transmitted by the crankshaft angular position sensor 93—the angular position of the crankshaft 9 corresponding to the travel of said target 92 in front of the target travel sensor 91.

The position of the target 92 relative to the crown of the piston 2, the position of the target travel sensor 91 relative to the cylinder head, not shown, and the law of variation of the height of the piston 2 as a function of the angular position of the crankshaft 9 having been previously registered in the memory of the computer 94, said computer is able to determine the position of the crown of the piston 2 relative to the cylinder head when the piston 2 has reached its Top Dead Center (TDC), and therefore the effective volumetric ratio of the engine.

It is noted that, rather than measuring and registering the distance between the crown of the piston 2 and the target 92, and the distance between the target travel sensor 91 and the cylinder head, a simple solution consists, during assembly, in placing each cylinder 110 of the variable compression ratio engine at a volumetric ratio that is known and recorded by means of appropriate metrology or by any other means.

Once each cylinder 110 of said engine is placed at said known volumetric ratio, the engine is made to rotate and the computer 94 can establish definitively the relation that there is for each cylinder 110 of said engine between the volumetric ratio of said cylinder 110, the point of travel of the target 92 of the piston 2 of said cylinder 110 in front of the target travel sensor 91 and the angular position of the crankshaft 9 of said engine.

Once this relation is known, the computer 94 can compute at any time the effective volumetric ratio of each cylinder 110.

It must moreover be understood that the foregoing description has been given only as an example and that it in no way limits the field of the invention which the user would not depart from by replacing the described details of execution by any other equivalent.

The invention claimed is:

1. A device to measure the effective volumetric ratio of at least one cylinder (110) of a variable compression ratio engine, comprising:

at least one target travel sensor (91) attached to the cylinder block (100) and situated beneath the rolling surface of a synchronized roller (40) of a rolling guidance device (4) which detects the travel of at least one target (92) situated on a transmission member (3) secured to the piston (2) of said engine, said target travel sensor (91) interacting with at least one angular position sensor of a crankshaft (93) of said engine, and a computer (94).

2. The device to measure the effective volumetric ratio of at least one cylinder of a variable compression ratio engine as claimed in claim 1, wherein the target (92) is placed on the face of the transmission member (3) which comprises a small-dimension rack (37).

3. The device to measure the effective volumetric ratio of at least one cylinder of a variable compression ratio engine as claimed in claim 1, wherein the target (92) consists of a hole arranged in the transmission member (3).

4. The device to measure the effective volumetric ratio of at least one cylinder of a variable compression ratio engine as claimed in claim 1, wherein the target (92) consists of a pin secured to the transmission member (3).

* * * * *